US006971270B2

(12) United States Patent
Jang et al.

(10) Patent No.: US 6,971,270 B2
(45) Date of Patent: Dec. 6, 2005

(54) METHOD AND APPARATUS FOR MEASURING GRIPPING STRENGTH OF A VACUUM WAND

(75) Inventors: Ruei-Hung Jang, Sinjhuang (TW); Chih-Lin Ying, Yonghe (TW); Tsung-Chi Hsieh, Hsinchu (TW); Sheng-Liang Pan, Hsinchu (TW); Ching-Hui Tai, Jhubei (TW)

(73) Assignee: Taiwan Semiconductor Manufacturing Company, Hsin-Chu (TW)

( * ) Notice: Subject to any disclaimer, the term of this patent is extended or adjusted under 35 U.S.C. 154(b) by 48 days.

(21) Appl. No.: 10/782,036

(22) Filed: Feb. 19, 2004

(65) Prior Publication Data

US 2005/0183510 A1 Aug. 25, 2005

(51) Int. Cl.[7] .................................................. G01L 7/00
(52) U.S. Cl. ...................................................... 73/714
(58) Field of Search .......................... 73/700, 714, 756, 73/862.03, 862.52, 862.53, 862.541, 1.08, 73/1.25, 1.58, 379.02

(56) References Cited

U.S. PATENT DOCUMENTS

| | | | |
|---|---|---|---|
| 3,672,219 A | * | 6/1972 | Van Patten ............... 73/379.02 |
| 4,767,142 A | | 8/1988 | Takahashi et al. |
| 5,170,633 A | * | 12/1992 | Kaplan ........................... 62/94 |
| 5,783,754 A | * | 7/1998 | MacPherson ............ 73/862.03 |
| 5,889,199 A | | 3/1999 | Wong et al. |

* cited by examiner

Primary Examiner—William Oen
(74) Attorney, Agent, or Firm—Duane Morris LLP

(57) ABSTRACT

A method and apparatus for measuring the vacuum gripping strength of a vacuum wand or robotic arm provides a pressure gauge and a conduit extending from the pressure gauge and terminating at an opening formed in a receiving surface. A vacuum wand head is positioned on the receiving surface such that the gripping surface of the vacuum wand forms a conterminous boundary with the receiving surface and the vacuum port of the vacuum wand is aligned over the opening formed in the receiving surface. The receiving surface replicates a wafer surface so that the same vacuum gripping strength as would be delivered to a wafer being gripped by the vacuum wand, is thereby sensed by the pressure gauge. Spring loaded positioning members act in conjunction with a clamp member and a mechanical stop position the vacuum wand head in the receiving area and over the opening and also to assure that the gripping surface of the vacuum wand head is flush against the surface of the receiving area. Diminution of vacuum gripping strength caused by scratches or other defects of the gripping surface that cause vacuum leaks between gripping surface and the wafer surface, are similarly reproduced and sensed by the pressure gauge.

25 Claims, 5 Drawing Sheets

METHOD AND APPARATUS FOR MEASURING GRIPPING STRENGTH OF A VACUUM WAND

FIELD OF THE INVENTION

This invention generally relates to an apparatus and method for measuring the gripping strength of an object holder used to hold and transport an object during the manufacture of the object. More particularly, this invention relates to an apparatus and method for measuring the gripping strength of a vacuum handling system such as a robotic arm or a vacuum wand used to handle semiconductor wafers in the semiconductor manufacturing industry.

BACKGROUND

Integrated circuits and other semiconductor devices are typically made by performing a series of processing operations upon a semiconductor substrate commonly referred to as a wafer. Wafers are substantially circular in shape and may include a diameter ranging from 4 to 12 inches or greater. The numerous processing operations used to form semiconductor devices on the wafer, may take place at various locations in various systems and processing tools, and the wafers are transported from one location to another using manual or automated vacuum handling tools that grip the backside of the wafer using (negative) vacuum pressure. Manual vacuum handling tools include vacuum wands which include a gripping surface and a vacuum port such that when a negative vacuum pressure force is delivered to the vacuum port, the gripping surface contacts and grips the backside of the wafer. In automated vacuum handling systems, robotic arms include gripping surfaces and vacuum ports, and work using the same principles.

As the diameter and therefore the mass of a wafer increases, it becomes more important to provide and maintain a negative vacuum pressure force at the gripping head of the vacuum gripping tool that is of sufficient strength to maintain an acceptable gripping strength. It is also important that the gripping strength does not deteriorate in time. Repeated use of a vacuum wand or robotic arm may cause the vacuum head to wear out. Loosened connections between the components of the vacuum wand or scratches or other defects on or in the vacuum head, may result in an insufficient gripping strength at the vacuum head. When the gripping strength of the vacuum wand or robotic arm is insufficient to grasp the semiconductor wafer, the wafer may drop causing scratches or breakage. Such scratches and fractures of the silicon wafers commonly used in semiconductor manufacturing, typically produce silicon dust that further contaminates the wafer and many other wafers in manufacturing environment.

It is therefore important to know the gripping strength of a vacuum gripping tool before using it to handle wafers. It would therefore be desirable to be able to monitor or measure the gripping strength to prevent a defective or worn out vacuum handling tool from being used to handle wafers in the production environment.

One prior art mechanism for measuring the gripping strength of the vacuum wand is provided in U.S. Pat. No. 5,783,754 which provides a hold tester to be held by a wafer holder such as a vacuum wand. A gauge coupled to the hold tester indicates the mechanical force applied by the wafer holder to hold tester. An operator manually pulls the wafer holder away from the hold tester until the wafer holder becomes separated from the hold tester. The maximum mechanical force applied by the wafer holder prior to disengagement is measured by the gauge. As such, a mechanical pulling force must be applied to the hold tester to determine vacuum gripping strength which is therefore measured in mechanical force. A shortcoming of such an operator-intensive mechanism is that the technique and therefore the measured, effective gripping strength may vary between operators. Moreover, the pull force may damage the transport system.

It would therefore be desirable to measure the gripping strength of a vacuum wand or a robotic arm using a reliable and repeatable method and apparatus that is not sensitive to operator technique. It would further be desirable to measure the vacuum pressure directly rather than using a force transducer that measures a maximum mechanical force attributable to vacuum gripping strength.

SUMMARY OF THE INVENTION

To achieve these and other objects and in view of its purposes, the present invention provides an apparatus and method for measuring the gripping strength of a vacuum gripping tool. The apparatus comprises a platform including a platform body and a platform surface for receiving a vacuum head of a vacuum gripping tool thereon. The apparatus further comprises a pressure gauge and a conduit extending through the platform body to the pressure gauge and terminating at an opening formed on the platform surface. A positioning device positions a recessed portion of the vacuum head over the opening.

In another exemplary embodiment, the present invention provides a method for measuring the gripping strength of a vacuum wand. The method includes providing a platform with a flat surface, the flat platform surface having an opening therein, the opening extending through the platform to a pressure gauge. The method further includes placing a gripping surface of a vacuum wand head of an operating vacuum wand, on the flat surface such that a vacuum port of the vacuum wand head opens to the opening, and, causing the pressure gauge to read vacuum gripping force provided by the vacuum wand delivered to the pressure gauge through the opening.

BRIEF DESCRIPTION OF THE DRAWINGS

The present invention is best understood from the following detailed description when read in conjunction with the accompanying drawing. It is emphasized that, according to common practice, the various features of the drawing are not necessarily to scale. On the contrary, the dimensions of the various features are arbitrarily expanded or reduced for clarity. Like numerals denote like features throughout the specification and drawing. Included in the drawing are the following figures.

DETAILED DESCRIPTION

Figure 1:
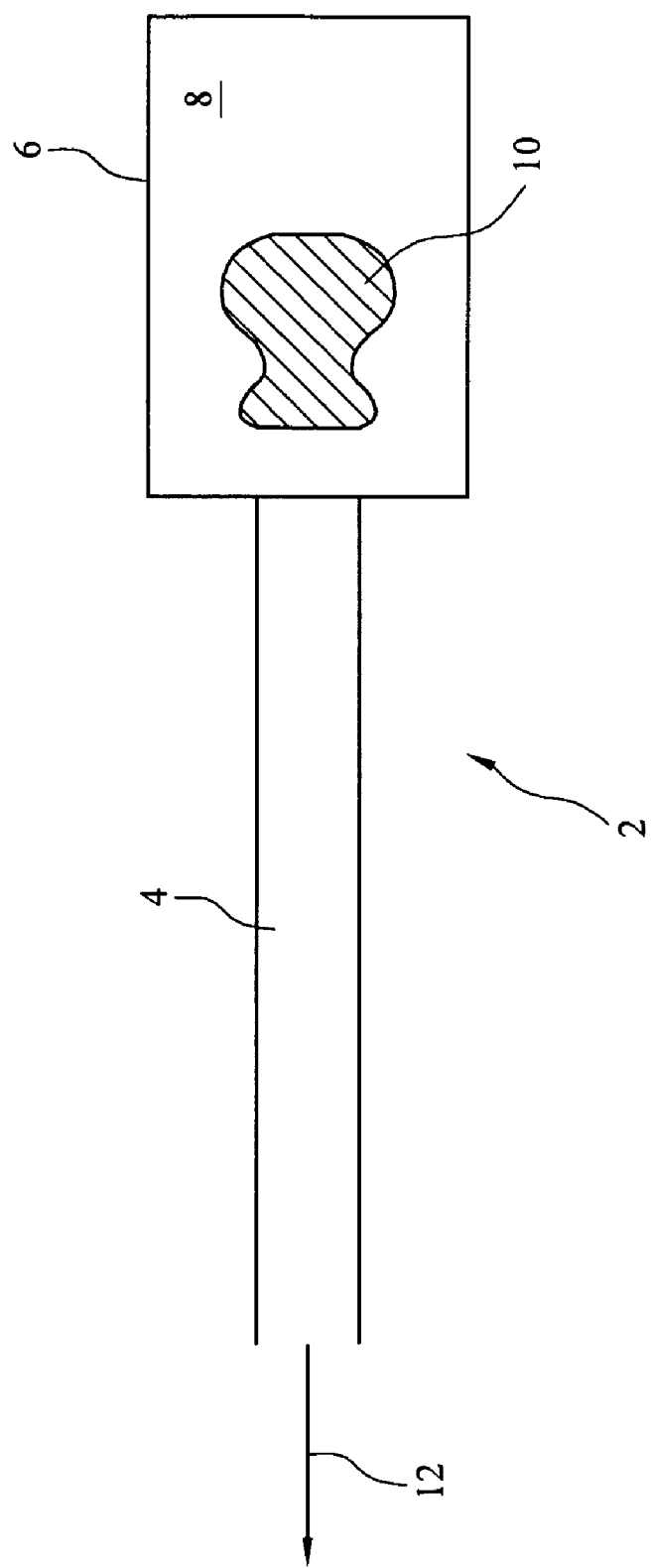
FIG. 1 is a plan view of an exemplary vacuum wand head.
Figure 2:
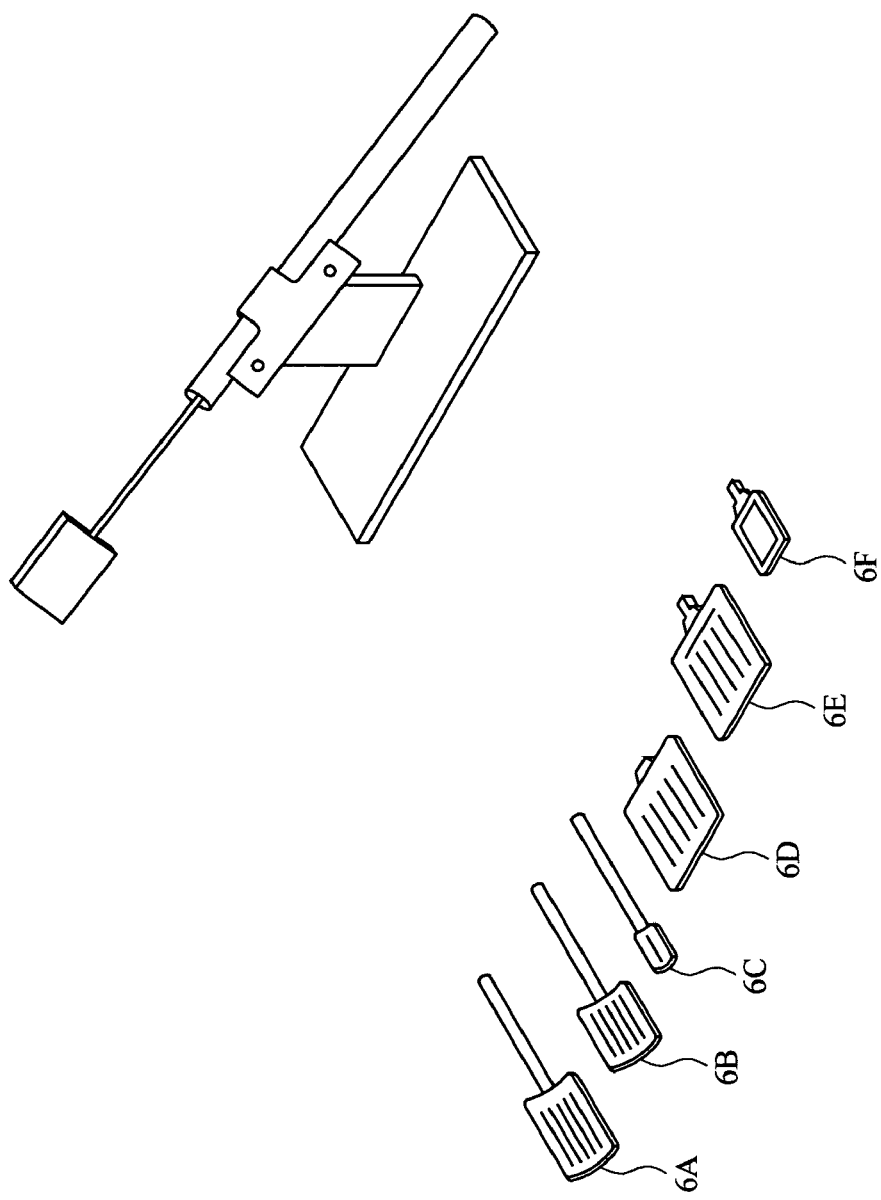
FIG. 2 is perspective view showing a plurality of exemplary vacuum wand heads that may be measured by the present invention.

FIG. 1 is a plan view of an exemplary vacuum wand which may have its gripping strength measured by the apparatus and method of the present invention. Vacuum wand 2 includes stem 4 and vacuum wand head 6. Vacuum wand head 6 includes gripping surface 8 which is used to grip a semiconductor wafer (not shown) when vacuum 12 is operating. Vacuum wand 2 also includes exemplary vacuum port 10 which is an opening in gripping surface 8 that is connected to the vacuum system and provides suction or negative pressure by means of vacuum 12. Vacuum port 10 may also be considered a recessed portion of vacuum wand head 6. The applied negative vacuum force secures a wafer to gripping surface 8 of vacuum wand 2. It should be understood that vacuum wand 2 is exemplary only and in particular, gripping surface 8 and vacuum port 10 may take on various configurations such as a series of a parallel grooves, or other configurations that optimize the tradeoff between providing a sufficient gripping surface 8 to contact the wafer surface while providing a vacuum port of sufficient of area to distribute the vacuum force to suitably grip the wafer. Various other exemplary vacuum wand head configurations are shown in FIG. 2, which illustrates exemplary vacuum wand heads 6A–6F. Although described heretofore and hereinafter as vacuum wands, it should be understood that so-described vacuum wands are merely representative of vacuum gripping tools such as vacuum wands and robotic arms and the like, that are used in the automated or manual vacuum transport of wafers and other substrates and are the subject of this invention.

Figure 3:
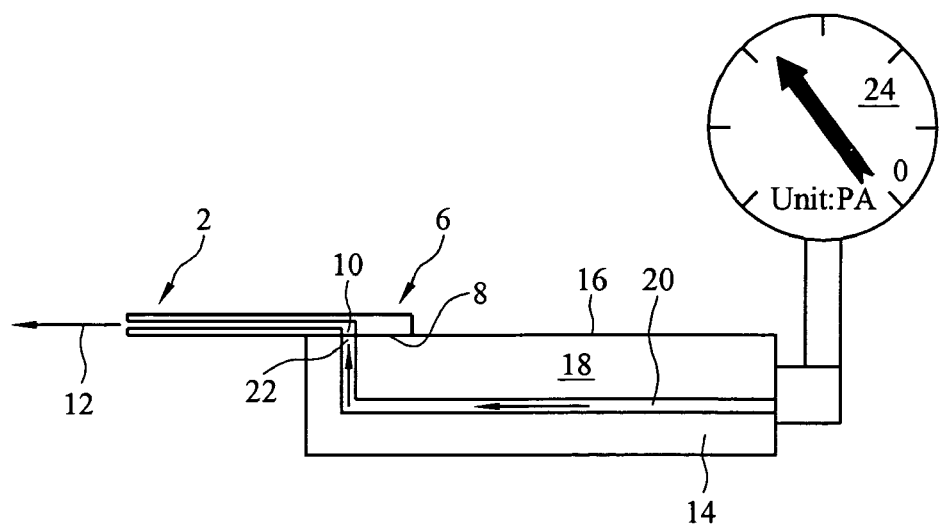
FIG. 3 is a schematic view of an exemplary vacuum gripping strength apparatus of the present invention.

FIG. 3 is a schematic, cross-sectional view showing elements of the vacuum gripping force measurement apparatus of the present invention. Vacuum wand 2 includes vacuum wand head 6 having gripping surface 8 disposed on platform surface 16 of platform 14. Conduit 20 extends through platform base 18 of platform 14 and terminates at opening 22 formed on platform surface 16. Conduit 20 further extends to pressure gauge 24. Pressure gauge 24 is a conventional tool that measures the negative (vacuum) pressure present in conduit 20 and displays the measured negative (vacuum) pressure in a readable format. In the exemplary embodiment, pressure gauge 24 includes a needle gauge indicative of measured vacuum pressure, i.e. the negative pressure produced by the vacuum system as sensed at and by pressure gauge 24. The apparatus of the present invention measures vacuum gripping strength which may alternatively be referred to as vacuum gripping force, vacuum pressure, vacuum, negative pressure, vacuum force, gripping force or gripping strength, but will generally be referred to hereinafter as vacuum gripping strength.

Still referring to FIG. 3, gripping surface 8 conterminously confronts pedestal surface 16. Vacuum wand head 6 is positioned such that vacuum port 10 i.e. the recessed portion of vacuum wand head 6, is aligned over opening 22. In FIG. 3, vacuum 12 represents the vacuum delivered to vacuum wand 2, and due to the alignment of vacuum port 10 over opening 22, this vacuum is the source of a negative pressure in conduit 20 that is delivered to and measured by pressure gauge 24. The negative pressure may be reduced, with respect to the strength of vacuum 12, by any vacuum leaks attributable to vacuum wand head 6.

Figure 4:
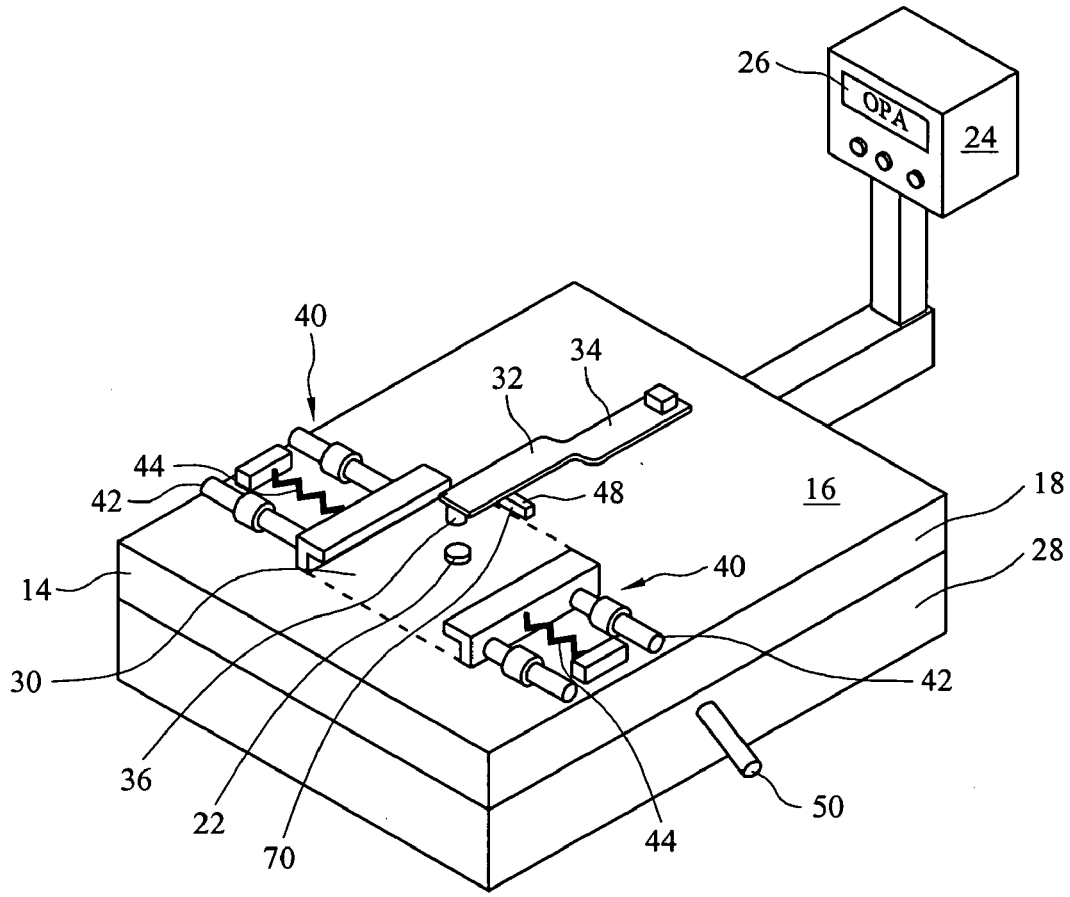
FIG. 4 is a perspective view of an exemplary vacuum gripping strength apparatus of the present invention.

FIG. 4 is a perspective view of an exemplary vacuum gripping strength measurement apparatus according to the present invention. In this exemplary embodiment, pressure gauge 24 includes digital display 26 which may display measured vacuum gripping strength digitally in PA (1 PA=1 Newton/$M^2$). In the exemplary illustrated vacuum gripping strength measuring apparatus, platform surface 16 includes receiving area 30 for receiving a vacuum wand head (not shown). When received in receiving area 30, the vacuum wand head will have its vacuum port disposed over opening 22 and its gripping surface forming a conterminous boundary with flat receiving area 30. The positioning and clamping members of the apparatus ensure that gripping surface 8 continuously contacts receiving area 30. Receiving surface 30 is planar and is advantageously formed of a firm and wear resistant material such as stainless steel, aluminum or Teflon. Receiving area 30 may advantageously be polished and include an anodized coating to promote contact between the gripping surface of the vacuum wand head and receiving surface 30. A planar and nondeformable receiving area 30 advantageously replicates a wafer surface so that grooves and scratches formed in the gripping surface that create vacuum leaks and diminish the vacuum gripping strength exerted upon the wafer surface, will have the same effect when the vacuum wand head is placed on receiving area 30. Such grooves and other scratches will similarly diminish the vacuum gripping strength delivered to opening 22 and therefore sensed by pressure gauge 24.

A pair of generally opposed, complimentary positioning members 40 work together to laterally urge and position a vacuum wand head in receiving area 30 such that the vacuum port (i.e. recessed portion of vacuum wand head 6 open to the vacuum line) is aligned over opening 22. Mechanical stop 48 includes orthogonal surface 70 that also aids in positioning the vacuum head wand in receiving area 30. Clamp member 32 includes flexible beam 34 affixed to platform surface 16 and contact 36 that contacts the opposed, non-gripping side of vacuum wand head 6. Clamp member 32 mechanically urges the vacuum wand head downwardly toward receiving area 30.

FIG. 4 also illustrates on/off switch 50 which may be used to provide voltage to pressure gauge 24 which is a transducer that converts negative air pressure, also referred to as vacuum pressure, to a digital or other readout. In an exemplary embodiment, batteries may be included within base 28 and in another exemplary embodiment, a power outlet connectible to a power source may be provided. In one exemplary embodiment, pressure gauge 24 may be pre-programmed to include acceptable and unacceptable vacuum gripping strength values and, upon measuring the vacuum gripping strength, pressure gauge 24 may compare the measured vacuum gripping strength to the pre-programmed values and display whether the measured vacuum gripping strength is acceptable or unacceptable by displaying a text message or by flashing another indication such as an associated illuminated color to indicate whether the measured vacuum force is acceptable or unacceptable. The pre-programmed unacceptable vs. unacceptable values may be calculated based on the weight of the particular wafers being used by vacuum wand. In an exemplary embodiment in which a 12-inch wafer having a weight of 27 grams is used, the required acceptable vacuum force may be (−60) PA or greater. Other acceptable values may be used in other exemplary embodiments and may depend upon wafer size and weight or other factors.

Figure 5:
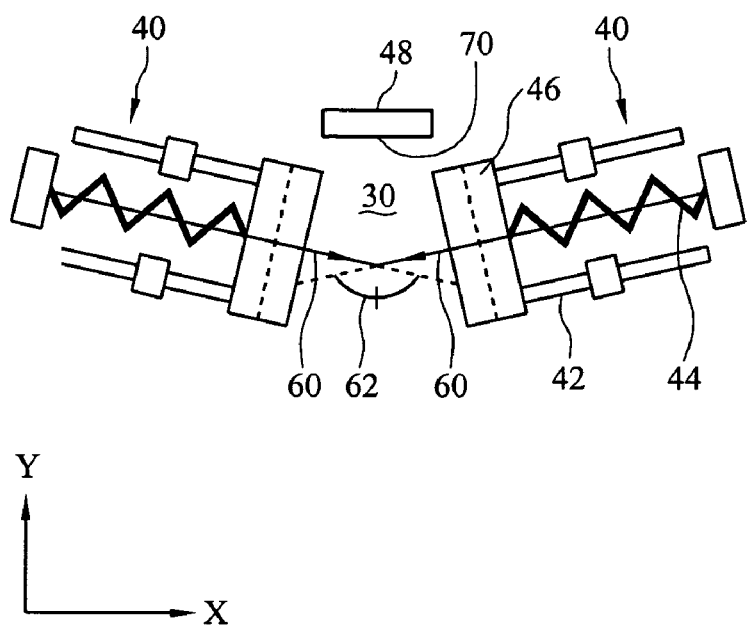
FIG. 5 is a top view of a positioning device used to position a vacuum wand head according to the present invention.

FIG. 5 shows the complimentary positioning members 40 in further detail and in an exemplary arrangement. The top view of FIG. 5 illustrates positioning members 40 which each include spring 44, guide pins 42 and abutment member 46. Opposed spring forces 60 form obtuse angle 62 and each provide a force component along the x-direction. Orthogonal face 70 of mechanical stop 48 prevents motion of a vacuum wand head positioned in receiving area 30, along the y-direction. Spring forces 60 are advantageously substantially equal and opposite along the x-direction to center the vacuum wand head within receiving area 30 and to position the vacuum port 10 (not shown) over opening 22 (not shown) of receiving area 30. The obtuse angle arrangement shown in FIG. 5 is exemplary only and in other exemplary embodiments, such as shown in FIG. 4, complimentary positioning members 40 may be directly opposed. The obtuse angle arrangement may assist in receiving a vacuum wand head that is wider than the space between opposed abutment members 46 when in rest position.

Figure 6:
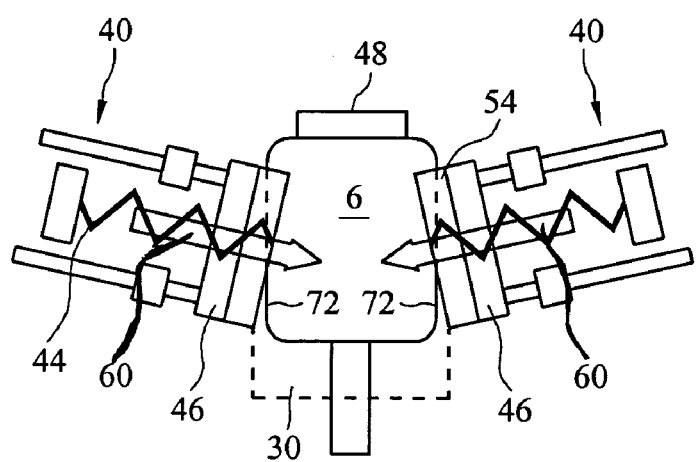
FIG. 6 is a top view showing a vacuum wand head positioned within the positioning device shown in FIG. 5.

FIG. 6 shows the arrangement of FIG. 5 after vacuum wand head 6 has been positioned within receiving area 30. Respective sides 72 each contact a corresponding abutment member 46 of positioning member 40. By means of respective and opposed spring forces 60 which are substantially of the same magnitude and in opposite direction along the x-direction, complimentary positioning members 40 each resiliently and automatically urge a vacuum wand head 6 inserted into receiving area 30, into its desired position in receiving area 30. Abutment members 46 each include overhang portion 54 which is shown in further detail in FIG. 7. Alternatively stated, when vacuum wand head 6 is in the desired alignment position, each of respective springs 44 are compressed substantially equally because spring forces 60 are substantially equal along the x-direction.

Figure 7:
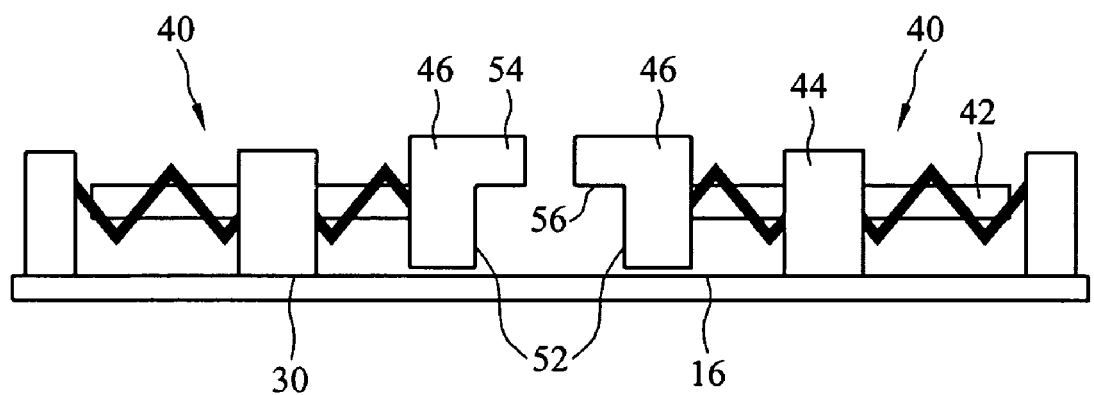
FIG. 7 is a side view of an exemplary positioning device of the vacuum gripping strength apparatus of the present invention.

FIG. 7 is a cross-sectional view of opposed complimentary positioning members 40. Each abutment member 46 includes respective guide face 52 which laterally contacts respective side 72 (see FIG. 6) of vacuum wand head 6, and overhang portion 54. Guide faces 52 are substantially orthogonal to platform surface 16 and overhang portions 54 each includes surface 56 which is substantially parallel to platform surface 16. Surfaces 56 may be used to guide vacuum wand head 6 toward platform surface 16 as well be shown in FIG. 8.

Figure 8:
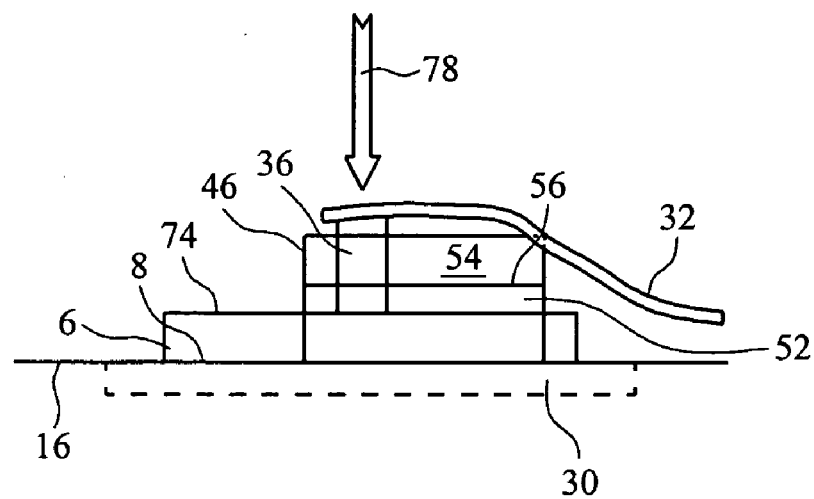
FIG. 8 is a side view of an exemplary clamping mechanism of the present invention.

FIG. 8 is a side view in partial cross section that shows vacuum wand head 6 positioned over platform surface 16 in receiving area 30. Vacuum wand head 6 includes opposed face 74 and it can be seen that surface 56 of overhang portion 54 prevents vacuum wand head 6 from tipping as surface 56 will contact opposed face 74 to prevent moment of the vacuum wand 6. FIG. 8 further illustrates clamping member 32 including contact 36 that contacts opposed face 74 of vacuum wand head 6 and provides vertical force 78 that urges and clamps vacuum wand head 6 in position such that gripping surface 8 conterminously confronts platform surface 16 in receiving area 30.

The mechanical positioning and clamping members are intended to be exemplary only and in other exemplary embodiments, other spring loaded or other mechanisms may be used to provide a mechanical force that urges the vacuum wand head laterally into a desired position within a receiving area 30 and downward to ensure contact between gripping surface 8 and platform surface 16.

The present invention has been described with respect to an apparatus or as an apparatus in combination with a vacuum gripping tool as shown in the figures. The invention can also be considered a method for measuring gripping strength of a vacuum wand, as described above. The method includes providing a flat surface on a platform, the flat surface having an opening therein and the opening extending through the platform to a pressure gauge. The method also includes placing a gripping surface of a vacuum wand head of an operating vacuum wand on the flat surface such that a vacuum port of the vacuum wand head is aligned facing the opening, and causing the vacuum gauge to read vacuum pressure exerted by the vacuum wand upon the opening.

The preceding merely illustrates the principles of the invention. It will thus be appreciated that those skilled in the art will be able to devise various arrangements which, although not explicitly described or shown herein, embody the principals of the invention and are included within its spirit and scope. Furthermore, all examples and conditional language recited herein are principally intended expressly to be only for pedagogical purposes and to aid the reader in understanding the principals of the invention and the concepts contributed by the inventors to furthering the art, and are to be construed as being without limitation to such specifically recited examples and conditions. For example, although the invention is described in relation to a vacuum wand, the principles of the present invention apply similarly to various other vacuum gripping tools. Moreover, all statements herein reciting principals, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the accompanying figures, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly,"etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. An apparatus for measuring the gripping strength of a vacuum gripping tool comprising:
    a platform including a platform body and a platform surface for receiving a vacuum head of a vacuum gripping tool thereon;
    a pressure gauge;
    a conduit extending through said platform body, extending to said pressure gauge, and terminating at an opening formed in said platform surface; and
    a positioning device that positions a vacuum port of said vacuum head over said opening.

2. The apparatus as in claim 1, wherein said vacuum head includes a flat gripping surface and said positioning device urges said flat gripping surface to conterminously confront a flat receiving surface of said platform surface.

3. The apparatus as in claim 1, further comprising a power source for providing voltage to said pressure gauge.

4. The apparatus as in claim 1, wherein said pressure gauge is pre-programmed with acceptable vacuum pressure values and unacceptable vacuum pressure values, measures vacuum pressure, and includes a display that indicates if measured vacuum pressure is acceptable or unacceptable.

5. The apparatus as in claim 1, wherein said pressure gauge displays a numeric value indicative of measured vacuum pressure.

6. The apparatus as in claim 1, further comprising a clamp that contacts said vacuum head and exerts a force that downwardly urges said vacuum head toward said platform surface.

7. The apparatus as in claim 6, wherein said clamp includes a flexible beam affixed to said platform surface.

8. The apparatus as in claim 1, wherein said positioning device includes a pair of complimentary positioning members, each positioning member including a spring and an abutment member, said pair of complimentary positioning members resiliently positioning said vacuum head over said opening.

9. The apparatus as in claim 8, wherein each positioning member further includes guide pins.

10. The apparatus as in claim 8, wherein said positioning members of said pair of complimentary positioning members urge said vacuum head in substantially opposite lateral directions.

11. The apparatus as in claim 8, wherein said positioning members of said pair of complimentary positioning members include respective spring force directions that form an obtuse angle.

12. The apparatus as in claim 8, wherein each abutment member includes a guide face substantially orthogonal to said platform surface and an overhang disposed over said guide face.

13. The apparatus as in claim 12, wherein said vacuum head includes an opposed face opposite said gripping surface, and each overhang portion includes a surface that faces said opposed face.

14. The apparatus as in claim 13, wherein each overhang portion contacts said opposed face and guides said vacuum head toward said platform surface.

15. The apparatus as in claim 8, wherein said positioning members of said pair of complimentary positioning members include respective opposite linear force components along a plane formed by said pedestal surface.

16. The apparatus as in claim 15, wherein said linear force component is along an x-axis direction and said positioning device further includes a mechanical stop that stops motion of said vacuum head along a y-axis direction of said plane.

17. The apparatus as in claim 1, wherein said positioning device further includes a mechanical stop affixed to said platform surface and having a stop surface substantially orthogonal to said platform surface and for stopping said vacuum head in a lateral direction.

18. The apparatus as in claim 1, wherein said positioning device includes a complimentary pair of resiliently compressible positioning members disposed about a receiving area such that, when said vacuum port is positioned over said opening, opposed sides of said vacuum wand head resiliently compress each of said positioning members substantially equally.

19. The apparatus as in claim 18, wherein said opposed sides of said vacuum head resiliently compress said positioning members in substantially opposite directions.

20. The apparatus as in claim 1, wherein said platform surface includes a flat receiving surface conterminously receiving a gripping surface of said vacuum head, said receiving surface formed of one of stainless steel, aluminum, and Teflon.

21. The apparatus as in claim 1, wherein said vacuum port comprises an opening in said vacuum head open to a vacuum source and includes a recessed portion recessed below a gripping surface of said vacuum head.

22. A method for measuring gripping strength of a vacuum wand comprising:
providing a flat surface on a platform, said flat surface having an opening therein, said opening extending through said platform to a pressure gauge;
placing a gripping surface of a vacuum wand head of an operating vacuum wand on said flat surface such that a vacuum port of said vacuum wand head is aligned facing said opening; and
causing said vacuum gauge to read vacuum pressure exerted by said vacuum wand upon said opening.

23. The method as in claim 21, further comprising automatically urging said vacuum wand head toward said flat surface.

24. The method as in claim 22, further comprising automatically laterally urging said vacuum port to an alignment position over said opening.

25. The method as in claim 24, wherein said automatically laterally urging comprises applying a complementary set of substantially opposite spring forces.

* * * * *